United States Patent [19]
Jeong et al.

[11] Patent Number: 5,714,999
[45] Date of Patent: Feb. 3, 1998

[54] METHOD AND APPARATUS FOR AUTOMATICALLY TRACKING AND PHOTOGRAPHING A MOVING OBJECT

[75] Inventors: Tae Hwa Jeong; Suk Woo Jeong, both of Kyungki-Do, Rep. of Korea

[73] Assignee: Samsung Electronics Co., Ltd., Kyungki-Do, Rep. of Korea

[21] Appl. No.: 955,267

[22] Filed: Oct. 1, 1992

[30] Foreign Application Priority Data

Oct. 1, 1991 [KR] Rep. of Korea ............. 91-17197

[51] Int. Cl.$^6$ ........................................... H04N 7/18
[52] U.S. Cl. ........................................... 348/169; 348/207
[58] Field of Search ........................... 358/125, 126, 358/210, 227, 108; 348/36, 143, 169, 170, 207, 347, 356, 211, 212, 213, 172; H04N 7/18, 5/232

[56] References Cited

U.S. PATENT DOCUMENTS

| | | | |
|---|---|---|---|
| 3,679,825 | 7/1972 | Kuhn | 348/170 |
| 3,736,376 | 5/1973 | Kafo, Jr. | 348/170 |
| 4,405,940 | 9/1983 | Woolfson et al. | 348/170 |
| 4,805,018 | 2/1989 | Nishimura et al. | 348/172 |
| 4,811,091 | 3/1989 | Morrison et al. | 358/108 |
| 4,949,181 | 8/1990 | Elberbaum | 358/108 |
| 5,005,083 | 4/1991 | Grage et al. | 348/169 |
| 5,077,613 | 12/1991 | Hirao et al. | 358/227 |
| 5,091,781 | 2/1992 | An | 358/126 |
| 5,164,827 | 11/1992 | Paff | 358/108 |
| 5,175,694 | 12/1992 | Amato | 358/125 |
| 5,185,667 | 2/1993 | Zimmermann | 358/108 |
| 5,187,585 | 2/1993 | Kaneda et al. | 358/227 |
| 5,223,875 | 6/1993 | Yanagisawa | 358/125 |
| 5,231,483 | 7/1993 | Sieber et al. | 348/169 |
| 5,241,380 | 8/1993 | Benson et al. | 358/108 |
| 5,243,418 | 9/1993 | Kuno et al. | 348/170 |
| 5,384,594 | 1/1995 | Sieber et al. | 348/169 |

FOREIGN PATENT DOCUMENTS 4232674  4/1993  Germany ............. H04N 5/232

*Primary Examiner*—Richard Lee
*Attorney, Agent, or Firm*—Sughrue, Mion, Zinn, Macpeak & Seas, PLLC

[57] ABSTRACT

A method and an apparatus for automatically tracking and photographing a moving object for use in a camera. The apparatus includes a plurality of memory units for sequentially storing image signals input to the camera according to a predetermined time period. A sensor is used to sense a difference between corresponding address bits in the respective memory locations. A voltage detector is used to select a voltage for angularly shifting a focal point of the camera by a distance proportional to the output of the sensor. A driving motor is used to angularly shift the focal point of the camera.

11 Claims, 3 Drawing Sheets

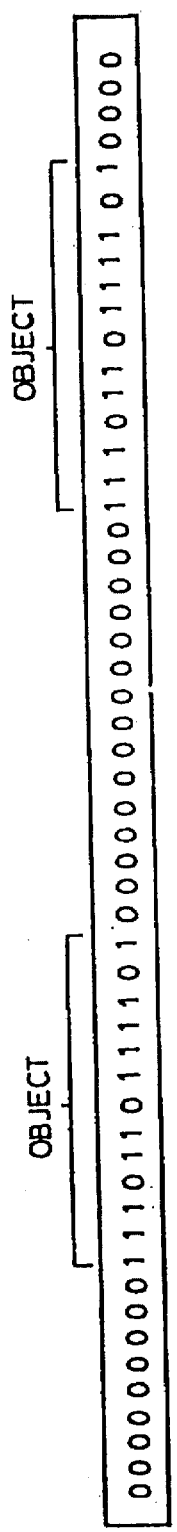
FIG. 2
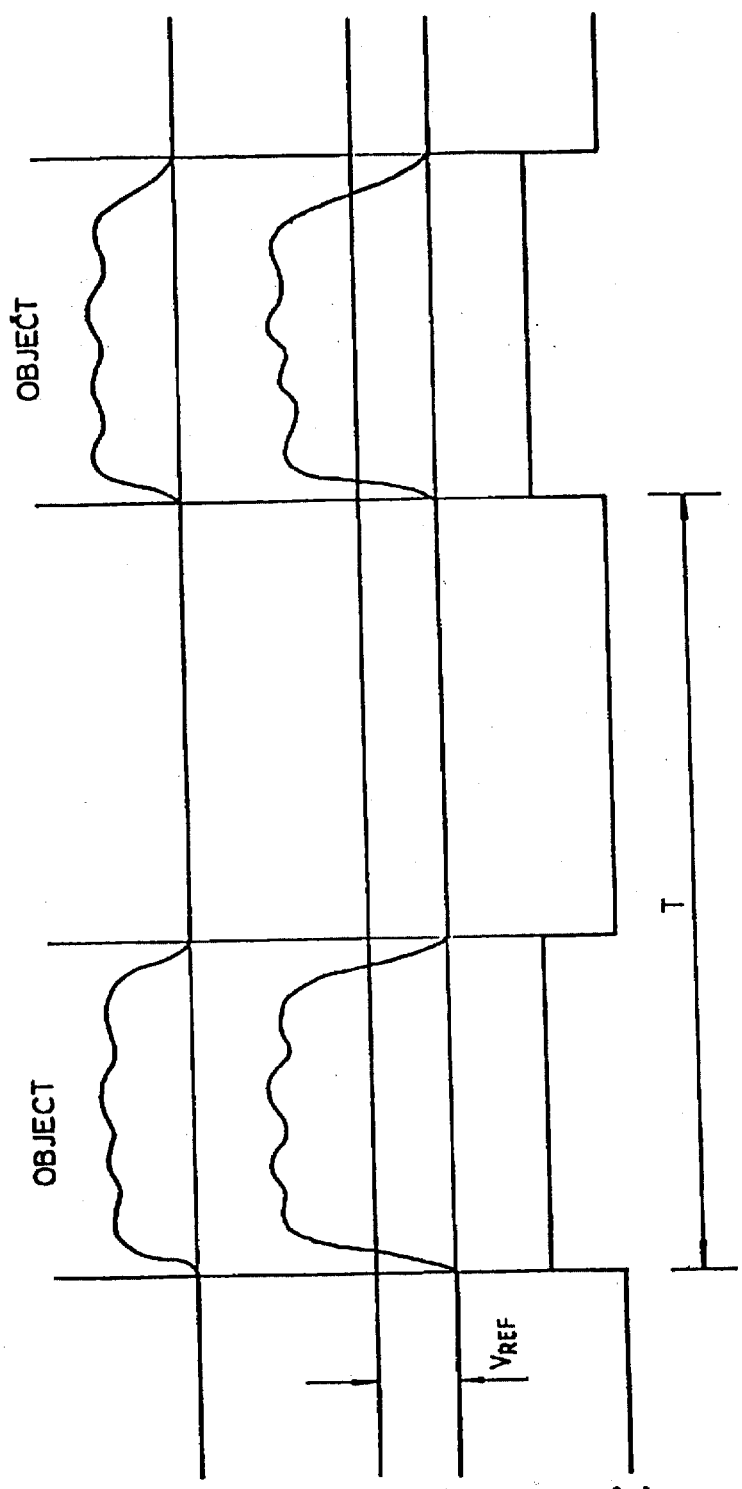
FIG. 3A
FIG. 3B
FIG. 3C

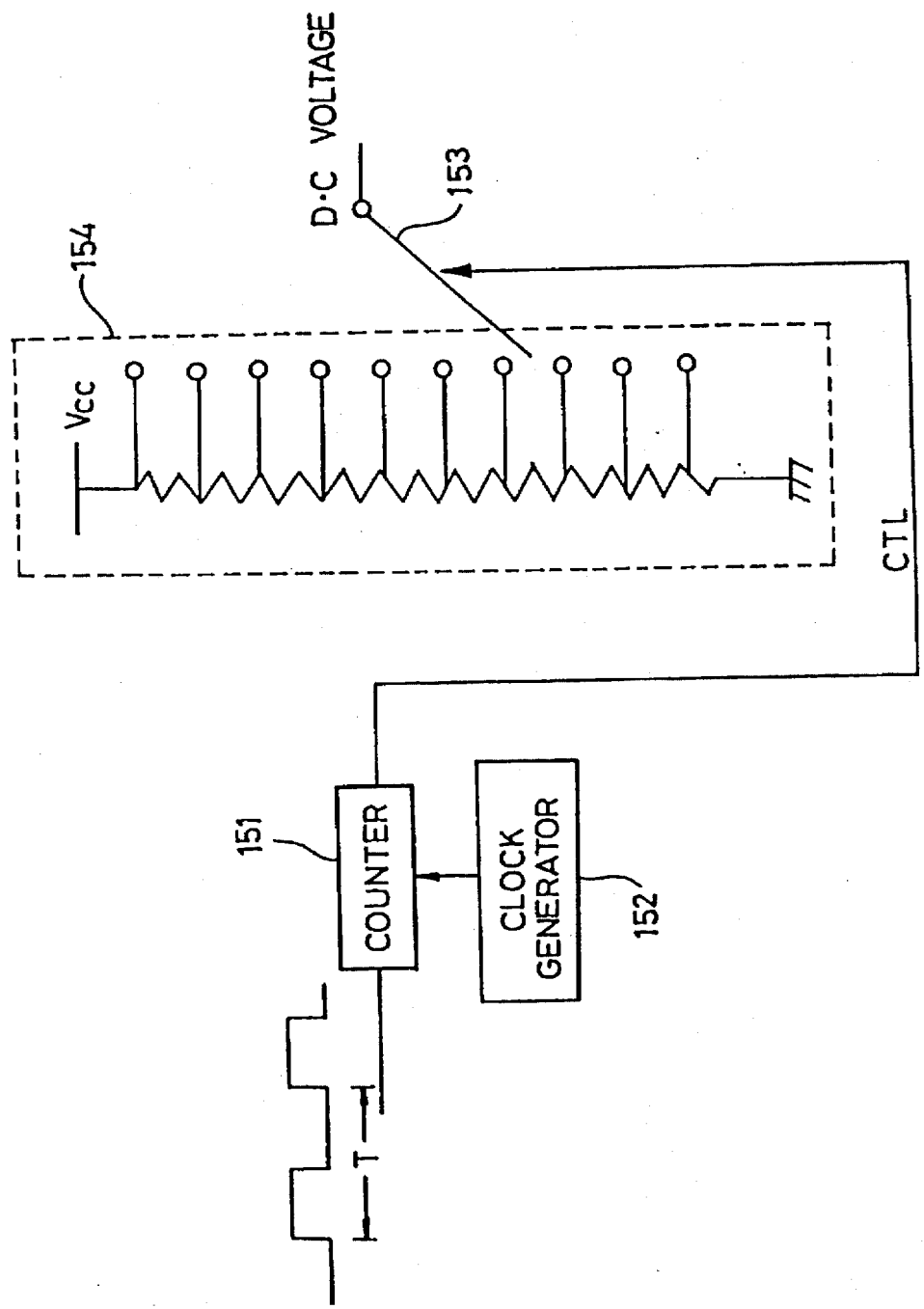

METHOD AND APPARATUS FOR AUTOMATICALLY TRACKING AND PHOTOGRAPHING A MOVING OBJECT

BACKGROUND OF THE INVENTION

The present invention relates to a method and apparatus for automatically tracking and photographing a moving object for use in a system using a camera.

When a user photographs a moving object with a conventional camera, such as a video camera, etc., the user must intentionally move his body such that the camera moves in the direction of the object's motion. This body motion alters the direction in which the camera lens is pointed in order to take a picture of the moving object. However, with a conventional video camera it is difficult to take a picture of the moving object while maintaining the moving object in the middle of a video screen or in a constant place on the screen. It is also difficult to manually track and photograph the moving object.

A conventional system for automatically focusing and photographing a moving object is disclosed in U.S. Pat. No. 4,980,715. However, this conventional automatic focus adjusting apparatus is only for automatically adjusting a focusing distance between a moving object and a camera lens. The system of U.S. Pat. No. 4,980,715 does not teach a method and an apparatus for moving a camera lens in the direction of a moving object.

Another system (U.S. Pat. No. 5,091,781) commonly assigned with the present application, discloses a camera moving apparatus used to move a camera in the same direction as that of a moving object. In the '781 system, luminance signals stored in picture memory are multiplexed, and the multiplexed signals are added and subtracted in a desired manner. The multiplexed peak values of the luminance signals are peak detected and a camera moving control signal is supplied to a camera driving unit based on these peak detected signals thereby moving the camera according to the direction of the picture's movement. However, the system of U.S. Pat. No. 5,091,781 does not use the present invention's method and apparatus for detecting the picture's movement.

SUMMARY OF THE INVENTION

It is an object of the present invention to provide a method and an apparatus for automatically tracking and photographing a moving object.

It is another object of the present invention to provide a method and an apparatus for maintaining a picture of an object in a constant location on each picture screen by automatically tracking and photographing the moving object.

To accomplish the above objects, the present invention provides a method for automatically tracking and photographing a moving object for use in a camera. The method stores image signals input to the camera in a plurality of memory locations according to a predetermined time interval and predetermined sequence. The present method also detects the image signals stored in the respective memory locations and senses differences between address bits in the respective memory locations. These differences correspond to movement of the object. Next, the method calculates a time interval proportional to a distance, that the object has moved by using the difference values between corresponding addressed bits in memory. Finally, the method drives the camera by the distance that the object has moved according to the magnitude of the calculated time interval.

The invention also provides an apparatus for automatically tracking and photographing a moving object for use in a camera. The apparatus includes a plurality of memory units for sequentially storing image signals input to the camera according to a predetermined time interval. A memory selection circuit is used for sequentially selecting one of the plurality of memory units according to the predetermined time interval. The apparatus also includes means for detecting the image signals stored in memory and for sensing differences between addressed bits in the respective memory locations with respect to the image signals input from the object. A voltage detector is used for selecting a voltage proportional to the output of the sensing means, so as to angularly displace a focal point of the camera by an amount equal to the movement of the object. A driving motor is used for angularly shifting the focal point of the camera according to the output of the voltage detector.

The above objects and other advantages of the present invention will become more apparent by describing the preferred embodiment of the present invention with reference to the attached drawings.

BRIEF DESCRIPTION OF THE DRAWINGS

FIG. 2 is an exemplary diagram for explaining an address signal which results from mixing the signals stored in the respective memory units shown in FIG. 1;

FIGS. 3A, 3B and 3C are waveform diagrams resulting from the address signal of FIG. 2; and FIG. 4 is a detailed circuit diagram showing the voltage detector of FIG. 1.

DETAILED DESCRIPTION OF THE PREFERRED EMBODIMENT

Figure 1:
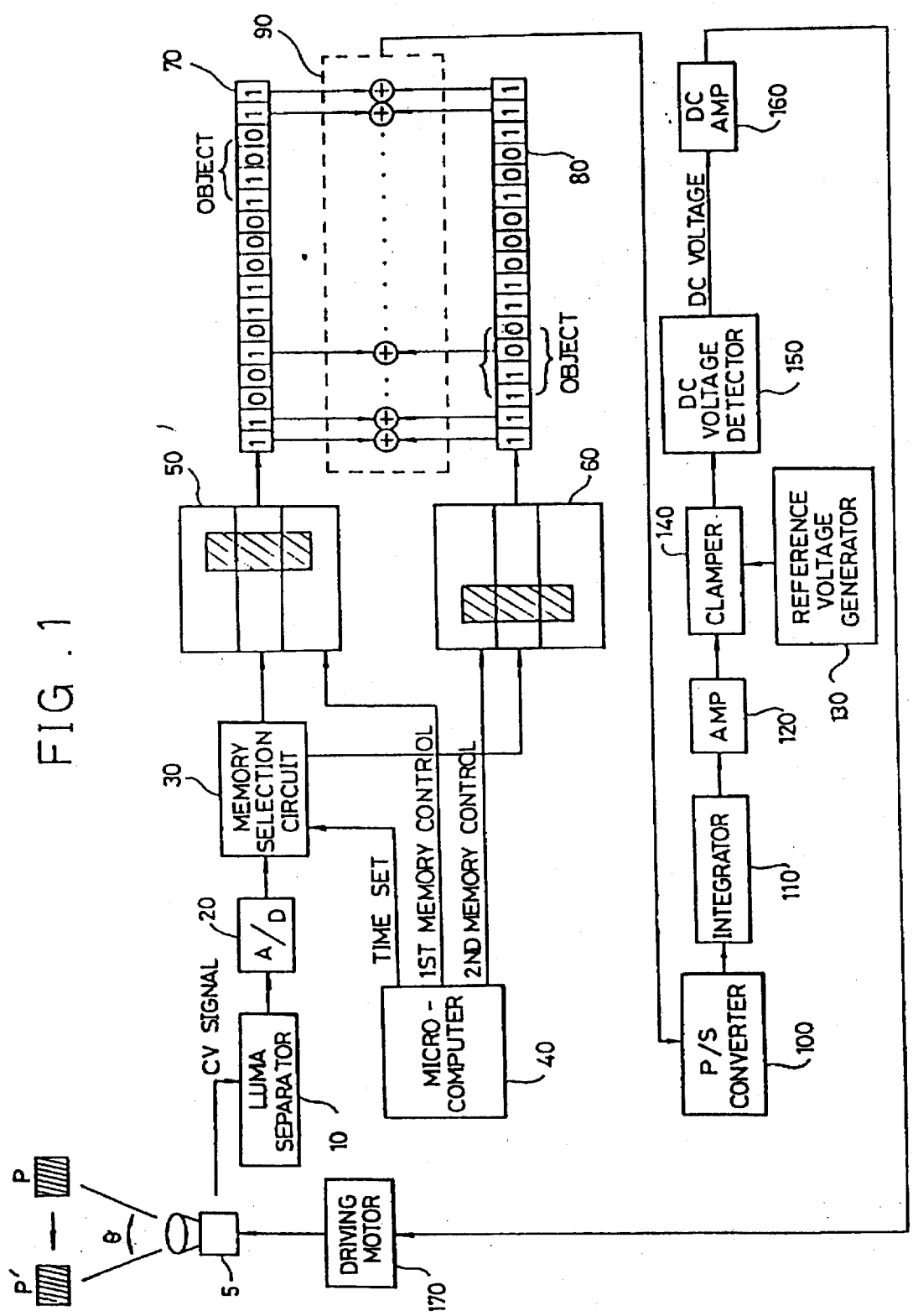
FIG. 1 is a block diagram showing circuitry of a preferred embodiment of the present apparatus for automatically tracking and photographing a moving object for use in a camera.

A preferred embodiment of the present invention will be described hereinafter with reference to the attached drawings.

A block diagram relating to an apparatus for automatically tracking and photographing a moving object is shown in FIG. 1.

In FIG. 1, a composite video signal CV from a camera 5 is supplied to a luminance separator 10. The composite video signal CV includes an image signal of a moving object. An A/D converter 20 converts an analog luminance signal from the luminance separator 10 into a digital signal. A memory selection circuit 30 sequentially stores the digital signals from the A/D converter 20 in a first memory unit 50 and a second memory unit 60, alternating therebetween at a constant interval, in accordance with the image signal of the moving object. The memory selection circuit 30 alternatively selects each memory unit 50 and 60 according to the time interval set in a microcomputer 40.

During operation data corresponding to the first memory location of the object to be photographed is input to, and stored in, the first memory unit 50. Then, after the time preset in microcomputer 40 has passed, data corresponding to the location of the object which has moved during the preset time is input to, and stored in, the second memory unit 60. First and second buffers 70 and 80 extract and temporarily store the data stored in particular addresses of the first and second memory units 50 and 60, respectively. Specifically, the first and second buffers 70 and 80 extract and store the data stored in the middle of the respective memory units 50 and 60. Since the camera 5 has not yet moved, at this stage of operation the data in both buffers 70 and 80 is the same except for the data corresponding to the object portion of the image signal. Next, corresponding addresses of the object portion from both buffers 70 and 80 are exclusively OR-ed with one another in an exclusive OR gate 90 and output as parallel data. Thereafter, a parallel-to-serial (P/S) converter 100 converts the parallel data signals into serial signals.

FIG. 2 shows the output from the P/S converter 100. As shown in FIG. 2, the remaining data portions not corresponding to the object all equal "0" and the object data portions are composed of pulse-shaped serial signals, each of which includes a combination of "0's" and "1's".

FIGS. 3A, 3B and 3C show waveform diagrams obtained from the output of an integrator 110 (shown in FIG. 1). The output of the P/S converter 100 is integrated in integrator 110, thereby forming the waveform shown in FIG. 3A. An amplifier 120 amplifies the integrated signal waveform to produce the waveform diagram shown in FIG. 3A. The output of the amplifier 120 is clamped in a clamper 140 for use as a reference voltage of the reference voltage generator 130. The clamper outputs a rectangular waveform (shown in FIG. 3C) having a time period T taken from the rising time of the first rectangular wave to the rising time of the second rectangular wave. The time period T is proportional to the distance between the object location P input to first memory unit 50 and the object location P' input to second memory unit 60.

FIG. 4 is a detailed circuitry diagram of the DC voltage detector 150 (shown in FIG. 1) used by the present invention. As shown in FIG. 4, the DC voltage detector 150 includes a counter 151 for counting the period of time T output by the clamped signal according to a predetermined clock from a clock generator 152. The detector 150 also includes a voltage selection switch 153 for selecting a particular voltage in voltage source portion 154 in accordance with the output of the counter 151. Thus, the magnitude of the voltage to be selected is proportionally determined according to the magnitude of the time T. Such a selected voltage is amplified through DC amplifier 160 (FIG. 1) and used to drive a motor 170. The motor 170 rotates the camera 5 based on the amplified signal, so as to rotate the camera 5 by an angle that corresponds to the object movement location P' for tracking the moving object to be photographed.

The above-described embodiment relates to horizontal movement of an object to be photographed. However, similar technology can be applied to photographing a vertically moving object.

Also, in this embodiment, only one moving object is described. However, the very same principle can be applied to a plurality of the moving objects. Thus, the apparatus for automatically tracking and photographing a moving object according to the present invention is adapted in a camera, thereby moving the camera up and down, and from left to right and vice versa, so as to automatically track and photograph one or more moving objects. Also, the present invention can be applied to any system adopting a camera, as well as a video camera.

In the present invention, the video signal stored in the respective memory units are extracted in the respective buffers, and the address signals stored in the respective buffers are exclusively and logically summed in the exclusive-OR gate. The amount of movement of the picture is detected based on this exclusive-OR signal. That is, when each of the bits of the address signals in the respective buffers is exclusively and logically summed, a high signal is output only when values of the OR-ed bits differ. On the other hand, a low signal is output when values of the bits are the same.

As described above, the present invention can take a picture of a moving object by automatically tracking the moving object to be photographed, thereby eradicating any inconvenience associated with shifting the direction of the camera lens. The invention also allows for harmonically photographing an object at a constant location on the picture screen.

What is claimed is:

1. A method for automatically tracking and photographing a moving object for use in a camera, said method comprising the steps of:

alternately storing image signals input to said camera in each of a plurality of memory units according to a first time interval having a predetermined period and according to a predetermined sequence;

detecting image signals stored in respective memory units, said memory units storing said image signals as bit values;

sensing a plurality of difference values, each of which is based on corresponding bit values in said plurality of memory units, said difference values representing a distance moved by said object;

calculating a second time interval, proportional to said distance moved by said object, based on said difference values between corresponding address bits in said respective memory units; and moving the camera by a desired distance according to a magnitude of said second time interval, wherein said sensing step outputs said difference values in parallel, said method further comprising the step of converting said parallel difference values, prior to calculating said second time interval, to a serial data string.

2. An apparatus for automatically tracking and photographing a moving object for use in a camera, said apparatus comprising:

a plurality of memory units for sequentially storing image signals input to the camera, each of said memory units storing values of said image signals as bit values;

a memory selection circuit for sequentially selecting and supplying said image signals to one of said plurality of memory units according to a time interval having a predetermined period;

detecting means directly connected to said memory units for detecting said values of said image signals stored in said plurality of memory units;

sensing means for sensing a plurality of difference values, each of which is based on corresponding detected bit values in different memory units;

a voltage detector for selecting a voltage proportional to an output of the sensing means; and a driving motor for angularly displacing the focal point of said camera, according to an output voltage of the voltage detector, by an amount equal to a movement of said object, wherein said sensing means comprises a plurality of exclusive-OR gates, each of which is connected to a corresponding address bit in each of said buffers.

3. An apparatus for automatically tracking and photographing a moving object for use in a camera, said apparatus comprising:

a plurality of memory units for sequentially storing image signals input to the camera, each of said memory units storing values of said image signals as bit values;

a memory selection circuit for sequentially selecting and supplying said image signals to one of said plurality of memory units according to a time interval having a predetermined period;

a plurality of buffers for selectively storing said values of said image signals stored in said plurality of memory units;

a logic circuit for determining a plurality of difference values, each of which is based on corresponding detected bit values stored in said buffers;

a voltage detector for selecting a voltage proportional to an output of said logic circuit; and a driving motor for angularly displacing the focal point of said camera, according to an output voltage of the voltage detector, by an amount equal to a movement of said object, wherein said logic circuit comprises a plurality of exclusive-OR gates, each of which is connected to a corresponding address bit in each of said buffers.

4. An apparatus for automatically tracking and photographing a moving object for use in a camera, said apparatus comprising:

a plurality of memory units for sequentially storing image signals input to the camera, each of said memory units storing values of said image signals as bit values;

a memory selection circuit for sequentially selecting and supplying said image signals to one of said plurality of memory units according to a time interval having a predetermined period;

detecting means directly connected to said memory units for detecting said values of said image signals stored in said plurality of memory units;

sensing means for sensing a plurality of difference values, each of which is based on corresponding detected bit values in different memory units;

a voltage detector for selecting a voltage proportional to an output of the sensing means; and a driving motor for angularly displacing the focal point of said camera, according to an output voltage of the voltage detector, by an amount equal to a movement of said object, wherein said sensing means comprises means for converting difference values detected in the plurality of memory units from parallel to serial data.

5. The apparatus for automatically tracking and photographing a moving object as claimed in claim 4, wherein said sensing means further comprises waveform generation means for converting said serial data into an integral waveform.

6. The apparatus for automatically tracking and photographing a moving object as claimed in claim 5, wherein said voltage detector comprises a counter for measuring a time period of the integral waveform generated by the waveform generation means.

7. An apparatus for automatically tracking and photographing a moving object for use in a camera, said apparatus comprising:

a plurality of memory units for sequentially storing image signals input to the camera, each of said memory units storing values of said image signals as bit values;

a memory selection circuit for sequentially selecting and supplying said image signals to one of said plurality of memory units according to a time interval having a predetermined period;

a plurality of buffers for selectively storing said values of said image signals stored in said plurality of memory units;

a logic circuit for determining a plurality of difference values, each of which is based on corresponding detected bit values stored in said buffers;

a voltage detector for selecting a voltage proportional to an output of said logic circuit; and a driving motor for angularly displacing the focal point of said camera, according to an output voltage of the voltage detector, by an amount equal to a movement of said object, wherein said logic circuit further comprises a converter for converting said difference values determined based on said corresponding detected bit values stored in said buffers from parallel to serial data.

8. The apparatus for automatically tracking and photographing a moving object as claimed in claim 7, wherein each of said buffers is a serial buffer and wherein said serial buffer is connected to a respective memory unit.

9. The apparatus for automatically tracking and photographing a moving object as claimed in claim 7, wherein said buffers are connected to respective memory units so as to permit extraction and storage of selected portions of said image signals stored in said respective memory units.

10. The apparatus for automatically tracking and photographing a moving object as claimed in claim 7, further comprising an integrator serially connected between said converter of said logic circuit and said voltage detector for converting said serial data into an integral waveform.

11. The apparatus for automatically tracking and photographing a moving object as claimed in claim 10, wherein said voltage detector comprises a counter for measuring a time period of the integral waveform generated by the integrator.

* * * * *